United States Patent
Ohmura et al.

(10) Patent No.: US 11,180,144 B2
(45) Date of Patent: Nov. 23, 2021

(54) DRIVING SUPPORT CONTROL DEVICE

(71) Applicant: MAZDA MOTOR CORPORATION, Hiroshima (JP)

(72) Inventors: Hiroshi Ohmura, Hiroshima (JP); Sahori Iimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 163 days.

(21) Appl. No.: 16/494,412

(22) PCT Filed: Feb. 16, 2018

(86) PCT No.: PCT/JP2018/005467
§ 371 (c)(1),
(2) Date: Sep. 16, 2019

(87) PCT Pub. No.: WO2018/168322
PCT Pub. Date: Sep. 20, 2018

(65) Prior Publication Data
US 2020/0339119 A1 Oct. 29, 2020

(30) Foreign Application Priority Data

Mar. 17, 2017 (JP) .............................. JP2017-052141

(51) Int. Cl.
*B60W 30/165* (2020.01)
*B60W 30/16* (2020.01)
(Continued)

(52) U.S. Cl.
CPC ........ *B60W 30/165* (2013.01); *B60W 30/162* (2013.01); *G05D 1/0223* (2013.01);
(Continued)

(58) Field of Classification Search
CPC ............. B60W 30/165; B60W 30/162; B60W 2554/4041; B60W 2554/4049; G05D 1/0223; G05D 2201/0213; G06K 9/00798
(Continued)

(56) References Cited

U.S. PATENT DOCUMENTS

2012/0078484 A1* 3/2012 Kato .................... B60W 30/143
701/96
2015/0307095 A1* 10/2015 Aso ....................... B60W 30/12
701/1
(Continued)

FOREIGN PATENT DOCUMENTS

| DE | 10 2015 201 555 A1 | 8/2016 |
|----|---------------------|--------|
| EP | 2 939 894 A2 | 11/2015 |

(Continued)

OTHER PUBLICATIONS

International Preliminary Report On Patentability and Written Opinion issued in PCT/JP2018/005467; dated Sep. 17, 2019.
(Continued)

*Primary Examiner* — Thomas G Black
*Assistant Examiner* — Matthias S Weisfeld
(74) *Attorney, Agent, or Firm* — Studebaker & Brackett PC

(57) ABSTRACT

The driving support control device is configured to, when a preceding vehicle is detected (S24: YES), be permitted to cause a transition to the preceding vehicle following mode, in response to a manipulation made by the driver to select the preceding vehicle following mode (S27), and then control the vehicle 1 to follow the preceding vehicle, and to, when edges of a traveling road are detected even though no preceding vehicle is detected (S25: YES), be permitted to cause the transition to the preceding vehicle following mode, in response to the manipulation made by the driver to
(Continued)

select the preceding vehicle following mode (S26), and then control the vehicle 1 to travel on and along a given target traveling course set based on the edges of the traveling road.

12 Claims, 7 Drawing Sheets

(51) Int. Cl.
  *G05D 1/02* (2020.01)
  *G06K 9/00* (2006.01)
(52) U.S. Cl.
  CPC . *G06K 9/00798* (2013.01); *B60W 2554/4041* (2020.02); *B60W 2554/4049* (2020.02); *G05D 2201/0213* (2013.01)
(58) Field of Classification Search
  USPC .......................................................... 701/96
  See application file for complete search history.

(56) References Cited

U.S. PATENT DOCUMENTS

| 2016/0288790 | A1* | 10/2016 | Aoki | B60W 30/165 |
| 2017/0072955 | A1* | 3/2017 | Ediger | B60W 50/0097 |
| 2018/0011497 | A1* | 1/2018 | Schroeder | B60W 30/12 |
| 2018/0120844 | A1 | 5/2018 | Okamoto et al. | |
| 2019/0308621 | A1* | 10/2019 | Inou | G08G 1/09 |

FOREIGN PATENT DOCUMENTS

| JP | 2004-078333 | A | | 3/2004 | |
| JP | 2012-035821 | A | | 2/2012 | |
| JP | 2016083990 | | * | 5/2016 | ............ B60W 10/06 |
| JP | 2016-190519 | A | | 11/2016 | |
| JP | 2016-207062 | A | | 12/2016 | |
| WO | 2016/175190 | A1 | | 3/2016 | |

OTHER PUBLICATIONS

International Search Report issued in PCT/JP2018/005467; dated May 22, 2018.
An Office Action; "Notification of Reasons for Refusal," Mailed by the Japanese Patent Office dated Aug. 27, 2018, which corresponds to Japanese Patent Application No. 2017-052141; with partial English translation.
The extended European search report issued by the European Patent Office dated Apr. 28, 2020, which corresponds to European Patent Application No. 18766947.8-1012 and is related to U.S. Appl. No. 16/494,412.

* cited by examiner

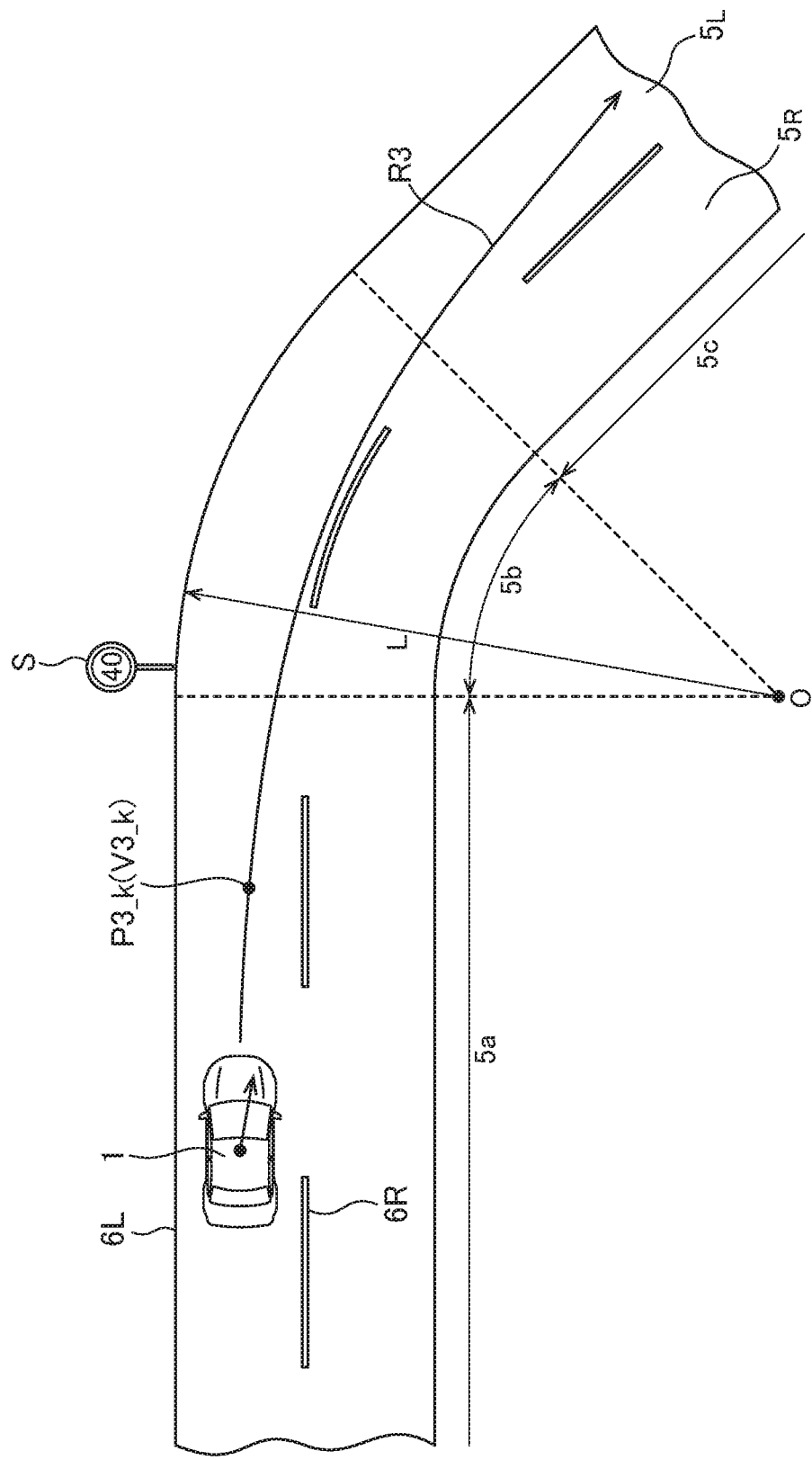

FIG.5

| Driving Support Mode | Detection of Lane | Detection of Preceding Vehicle | Target traveling course |
|---|---|---|---|
| Preceding Vehicle Following | Detectable | — | 1st traveling course (setup vehicle speed) |
| | Undetectable | Detectable | 2nd traveling course (vehicle speed of preceding vehicle) |
| | | Undetectable | 3rd traveling course |
| Automatic Speed Control | — | — | 3rd traveling course |
| Speed Limiting | — | — | 3rd traveling course |
| Basic Control | — | — | 3rd traveling course |

DRIVING SUPPORT CONTROL DEVICE

TECHNICAL FIELD

The present invention relates to a driving support control device, and more particularly to a driving support control device capable of providing plural driving support modes.

BACKGROUND ART

In recent years, a driving support control device has being becoming increasingly equipped in a vehicle to provide a given driving support mode to a driver (see, for example, the following Patent Document 1). A driving support control device described in the Patent Document 1 is configured to, in response to switch manipulation by a driver, cause switching from a manual mode (off mode) to a driving support mode for following a preceding vehicle (preceding vehicle following mode).

CITATION LIST

Patent Document

Patent Document 1: JP 2012-035821A

SUMMARY OF INVENTION

Technical Problem

However, in the device described in the Patent Document 1, in a situation where information about a preceding vehicle cannot be acquired, switching to the preceding vehicle following mode is disabled. For example, when a vehicle sensor does not detect any preceding vehicle even though the driver visually recognizes a preceding vehicle, switching to the preceding vehicle following mode becomes impossible. Such a situation can occur, e.g., when a vehicle and/or a preceding vehicle are traveling in a curve section. In this case, there is a problem that the manual mode will be maintained, i.e., it is impossible to reflect the driving intention of the driver. This also occurs when the driver performs a manipulation for transition from another driving support mode to the preceding vehicle following mode.

The present invention has been made to solve the above problem, and an object thereof is to provide a driving support control device capable of executing mode switching to a preceding vehicle following mode so as to comply with the driving intention of a driver.

Solution to Technical Problem

In order to achieve the above object, the present invention provides a driving support control device capable of controlling a vehicle in accordance with any one selected from plural driving support modes by a driver, wherein the plural driving support modes include a preceding vehicle following mode, and wherein the driving support control device is configured to, when a preceding vehicle is detected, be permitted to cause a transition to the preceding vehicle following mode, in response to a manipulation made by the driver to select the preceding vehicle following mode, and then control the vehicle to follow the preceding vehicle, and to, when edges of a traveling road are detected even though no preceding vehicle is detected, be permitted to cause the transition to the preceding vehicle following mode, in response to the manipulation made by the driver to select the preceding vehicle following mode, and then control the vehicle to travel on and along a given target traveling course set based on the edges of the traveling road.

In the driving support control device of the present invention having the above feature, upon selection of the preceding vehicle following mode by the driver, the driving support mode is transitioned to the preceding vehicle following mode. In the situation where the driver performs the manipulation for selecting the preceding vehicle following mode, it is assumed that the driver visually recognizes a followable preceding vehicle. That is, the driver performs the manipulation with a view to following the visually recognized preceding vehicle.

However, if detection of a preceding vehicle by a vehicle sensor is an essential condition for the transition to the preceding vehicle following mode, this transition is not permitted when no preceding vehicle is detected due to a positional relationship between a vehicle and a preceding vehicle. In this case, no switching to the preceding vehicle following mode is performed although the driver visually recognizes a preceding vehicle, i.e., the driving intention of the driver is not sufficiently reflected on the mode switching.

Therefore, in the present invention, the driving support control device is configured to, when a preceding vehicle is detected, be permitted to cause the transition to the preceding vehicle following mode, in response to the selection manipulation, and, and to, when the edges of the traveling road are detected even though no preceding vehicle is detected, be permitted to cause the transition to the preceding vehicle following mode, in response to the selection manipulation. In the latter case, however, the vehicle is controlled to travel on and along a given target traveling course set based on the detected edges of the traveling road.

As above, in the present invention, even when no preceding vehicle is detected a probability that the transition to the preceding vehicle following mode is permitted upon the manipulation by the driver to select the preceding vehicle following mode is increased. This makes it possible to more sufficiently reflect the driving intention of the driver during the mode switching to the preceding vehicle following mode.

In a specific embodiment of the present invention, the given target traveling course is a traveling course set to maintain traveling within the traveling road.

In a specific embodiment of the present invention, the plural driving support modes include: an automatic speed control mode in which control of causing the vehicle to travel at a given setup vehicle speed is executed; the preceding vehicle following mode; and a speed limiting mode in which a vehicle speed of the vehicle is restricted from exceeding a legal speed limit designated by a speed sign on a road.

In a specific embodiment of the present invention, the driving support control device is operable to: temporally repeatedly calculate a first traveling course which is set to maintain traveling within the traveling road, a second traveling course which is set to follow a trajectory of a preceding vehicle, and a third traveling course which is set based on a current traveling behavior of the vehicle on the traveling road; and select, as the target traveling course, one of the calculated traveling courses, based on the driving support mode selected by the driver.

Preferably, in the above embodiment, the driving support control device is operable, in the preceding vehicle following mode and when no edges of the traveling road are detected although a preceding vehicle is detected, select the second traveling course as the target traveling course.

According to this feature, as long as a preceding vehicle is detected even though no edges of the traveling road are detected, it is possible to control the vehicle to travel along the trajectory of the preceding vehicle.

Effect of Invention

The driving support control device of the present invention makes it possible to execute the mode switching to the preceding vehicle following mode so as to comply with the driving intention of a driver.

BRIEF DESCRIPTION OF DRAWINGS

FIG. 4 is an explanatory diagram of a third traveling course in this embodiment.

FIG. 5 is an explanatory diagram showing a relationship between a driving support mode and a target traveling course, in this embodiment.

DESCRIPTION OF EMBODIMENTS

Figure 1:
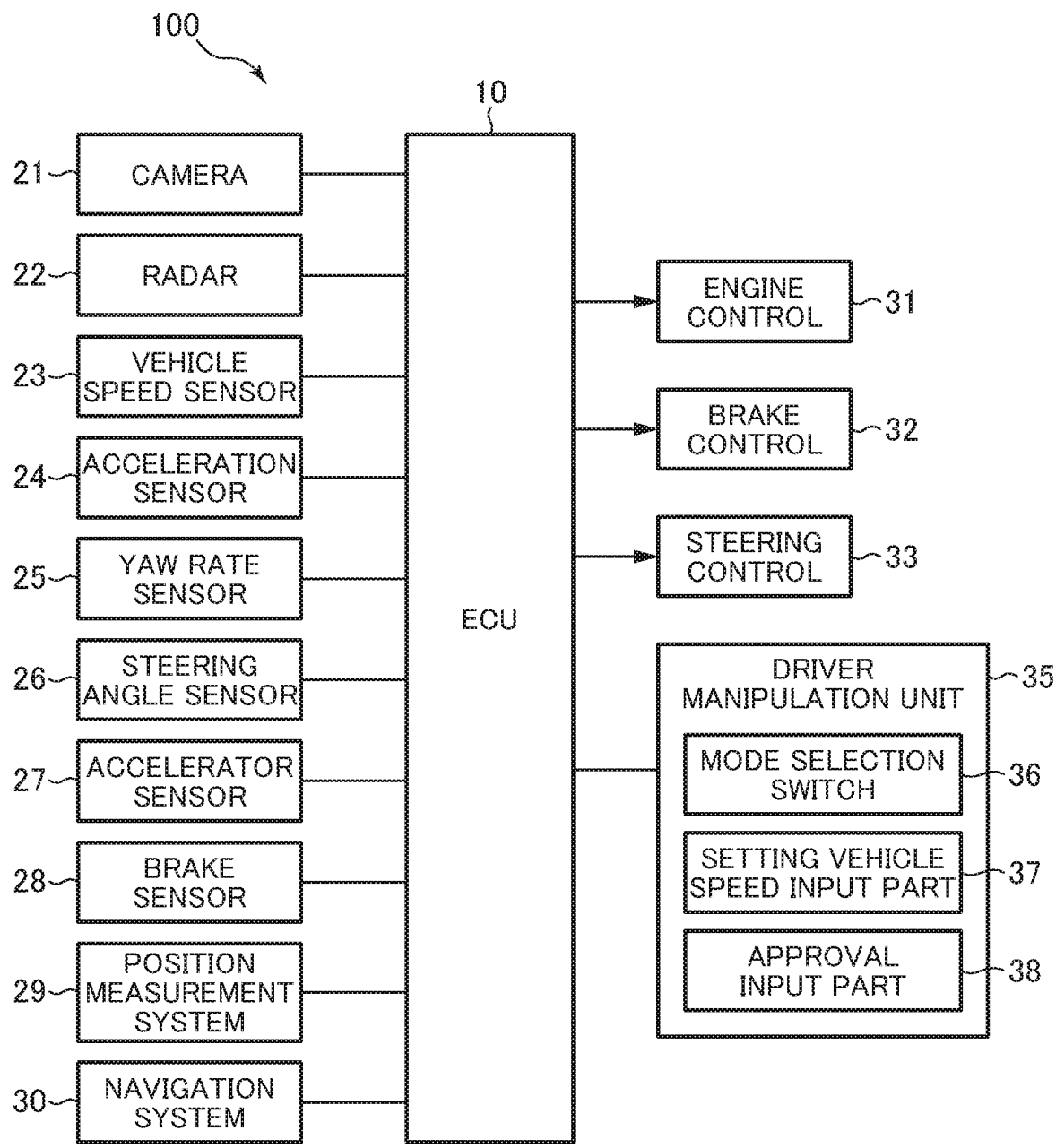
FIG. 1 is a configuration diagram of a driving support control system according to one embodiment of the present invention.

With reference to the accompanying drawings, a driving support control system according to one embodiments of the present invention will now be described. First of all, the configuration of the driving support control system will be described with reference to FIG. 1. FIG. 1 is a configuration diagram of the driving support control system.

The driving support control system 100 according to this embodiment is configured to provide different drive support controls to a vehicle 1 (see FIG. 2) in accordance with plural driving support modes, respectively. A driver can select a desired one of the plural driving support modes.

As shown in FIG. 1, the driving support control system 100 is equipped in the vehicle 1, and comprises a driving support control device (ECU) 10, plural sensors and switches, plural control sub-systems, and a driver manipulation unit 35 for allowing user input regarding the driving support modes. The plural sensors and switches include: a vehicle-mounted camera 21; a millimeter-wave radar 22; plural behavior sensors (a vehicle speed sensor 23, an acceleration sensor 24, and a yaw rate sensor 25) and plural behavior switches (a steering angle sensor 26, an accelerator sensor 27, and a brake sensor 28), a position measurement system 29, and a navigation system 30. Further, the plural control sub-systems include an engine control system 31, a brake control system 32 and a steering control system 33.

Other examples of the sensors and switches may include a peripheral sonar for measuring the distance and position of a surrounding structural object with respect to the vehicle 1, a corner radar for measuring a proximity of a surrounding structural object with respect to each of four corners of the vehicle 1, and an inner camera for taking an image of the inside of a passenger compartment of the vehicle 1. In this case, the ECU 10 is configured to receive measurement signals/data from these sensors and switches.

The driver manipulation unit 35 is provided in the passenger compartment of the vehicle 1 such that it can be manipulated by the driver, and comprises: a mode selection switch 36 for selecting a desired driving support mode from the plural driving support modes; a setting vehicle speed input part 37 for inputting a setting vehicle speed in accordance with the selected driving support mode; and an approval input part 38 for performing an approval input manipulation regarding a legal speed limit. The driver manipulation unit 35 may further comprise a setting inter-vehicle distance input part for setting an inter-vehicle distance between the vehicle 1 and a preceding vehicle. In response to manipulation of the mode selection switch 36 by the driver, a driving support mode selection signal according to the selected driving support mode is output.

The setting vehicle speed input part 37 comprises a vehicle speed change button, a setup vehicle speed display, and a confirmation button. The driver can manipulate the vehicle speed change button such that a desired setup vehicle speed is displayed on the setup vehicle speed display. Through this manipulation, a setup vehicle speed signal representing the displayed setup vehicle speed is output.

The approval input part 38 comprises a legal speed limit display, and an approval button. The driver can push down the approval button after confirming that a legal speed limit displayed on the legal speed limit display is coincident with a speed designated by a speed sign outside the vehicle 1. Through this manipulation, an approval signal is output.

The ECU 10 is composed of a computer comprising a CPU, a memory storing therein various programs, and an input/output device. The ECU 10 is configured to be operable, based on the driving support mode selection signal, the setting vehicle speed signal and the approval signal each received from the driver manipulation unit 35, and signals received from the plural sensors and switches, to output request signals for appropriately operating an engine system, a brake system and a steering system, respectively, to the engine control system 31, the brake control system 32 and the steering control system 33.

The vehicle-mounted camera 21 is operable to take images around the vehicle 1 and output image data about the taken images. The ECU 10 is operable to identify an object (e.g., a vehicle, a pedestrian, a road, a demarcation line (a lane border line, a white road line or a yellow road line), a traffic light, a traffic sign, a stop line, an intersection, an obstacle or the like) based on the image data. Alternatively or additionally, the ECU 10 may be configured to acquire information regarding such an object from outside via an in-vehicle communication device.

The millimeter-wave radar 22 is a measurement device for measuring the position and speed of the object (particularly, a preceding vehicle, a parked vehicle, a pedestrian, an obstacle or the like), and is operable to transmit a radio wave (transmitted wave) forwardly with respect to the vehicle 1 and receive a reflected wave produced as a result of reflection of the transmitted wave by the object. Then, the millimeter-wave radar 22 is operable, based on the transmitted wave and the received wave, to measure a distance between the vehicle 1 and the object, i.e., a vehicle-object distance, (e.g., inter-vehicle distance) and/or a relative speed of the object with respect to the vehicle 1. In this embodiment, instead of the millimeter-wave radar 22, a laser radar, an ultrasonic sensor or the like may be used to measure the vehicle-object distance and/or the relative speed. Further, the position and speed measurement device may be composed using a plurality of other sensors.

The vehicle speed sensor 23 is operable to detect an absolute speed of the vehicle 1.

The accelerator sensor 24 is operable to detect an acceleration (a longitudinal acceleration/deceleration in a longitudinal (forward-rearward) direction, and a lateral acceleration in a lateral (width) direction) of the vehicle 1.

The yaw rate sensor 25 is operable to detect a yaw rate of the vehicle 1.

The steering angle sensor 26 is operable to detect a turning angle (steering angle) of a steering wheel of the vehicle 1.

The accelerator sensor 27 is operable to detect a depression amount of an accelerator pedal.

The brake sensor 28 is operable to detect a depression amount of a brake pedal.

The position measurement system 29 is composed of a GPS system and/or a gyro system, and is operable to detect the position of the vehicle 1 (current vehicle position information).

The navigation system 30 stores therein map information, and is operable to provide the map information to the ECU 10. Then, the ECU 10 is operable, based on the map information and the current vehicle position information, to identify a road, an intersection, a traffic light, a building and others existing around the vehicle 1 (particularly, ahead of the vehicle 1 in the travelling direction). The map information may be stored in the ECU 10.

The engine control system 31 comprises a controller for controlling an engine of the vehicle 1. The ECU 10 is operable, when there is a need to accelerate or decelerate the vehicle 1, to output, to the engine control system 31, an engine output change request signal for requesting to change an engine output.

The brake control system 32 comprises a controller for controlling a braking device of the vehicle 1. The ECU 10 is operable, when there is a need to decelerate the vehicle 1, to output, to the brake control system 32, a braking request signal for requesting to generate a braking force to be applied to the vehicle 1.

The steering control system 33 comprises a controller for controlling a steering device of the vehicle 1. The ECU 10 is operable, when there is a need to change the travelling direction of the vehicle 1, to output, to the steering control system 33, a steering direction change request signal for requesting to change a steering direction.

Next, the driving support modes in the driving support control system 100 according to this embodiment will be described. In this embodiment, the driving support modes consist of four modes (a preceding vehicle following mode, an automatic speed control mode, a speed limiting mode, and a basic control mode).

Firstly, the preceding vehicle following mode is a mode in which the vehicle 1 is basically controlled to travel following a preceding vehicle, while maintaining a given inter-vehicle distance between the vehicle 1 and the preceding vehicle, and involves automatic steering control, automatic speed control (engine control and/or brake control), automatic obstacle avoidance control (the speed control and the steering control) to be executed by the driving support control system 100.

In the preceding vehicle following mode, the steering control and the speed control are performed in different manners, depending on detectability of opposed lane edges, and the presence or absence of a preceding vehicle. Here, the term "opposed lane edges" means opposed edges (a demarcation line such as a white road line, a road edge, an edge stone, a median strip, a guardrail or the like) of a lane in which the vehicle 1 is traveling, i.e., borderlines with respect to a neighboring lane and sidewalk, or the like. The ECU 10 is operable, when serving as a traveling road edge detection part, to detect the opposed lane edges from the image data about the images taken by the vehicle-mounted camera 21. Alternatively, the ECU 10 may be configured to detect the opposed lane edges from the map information of the navigation system 30. However, for example, in a situation where the vehicle 1 is traveling on the plain on which there is no traffic lane, instead of on a well-maintained road, or in a situation where reading of the image data from the vehicle-mounted camera 21 is bad, there is a possibility of failing to detect the opposed lane edges.

As above, in this embodiment, the ECU 10 is configured to serve as the traveling road edge detection part. Alternatively, the vehicle-mounted camera 21 may be configured to detect the opposed lane edges to serve as the traveling road edge detection part, or may be configured to detect the opposed lane edges in cooperation with the ECU 10 to serve as the traveling road edge detection part.

Further, the ECU 10 is operable, when serving as a preceding vehicle detection part, to detect a preceding vehicle, based on the image data from the vehicle-mounted camera 21, and the measurement data from the millimeter-wave radar 22. Specifically, the ECU 10 is operable to detect a second vehicle which is traveling ahead of the vehicle 1, as a preceding vehicle, based on the image data from the vehicle-mounted camera 21. Further, in this embodiment, the ECU 10 is operable, when the inter-vehicle distance between the vehicle 1 and the second vehicle is determined to be equal to or less than a given value (e.g., 400 to 500 m), based on the measurement data from the millimeter-wave radar 22, to detect the second vehicle as a preceding vehicle.

As above, in this embodiment, the ECU 10 is configured to serve as the preceding vehicle detection part. Alternatively, the vehicle-mounted camera 21 may be configured to detect a second vehicle which is traveling ahead of the vehicle 1 to serve as the preceding vehicle detection part, or the preceding vehicle detection part may be composed of not only the ECU 10 but also the vehicle-mounted camera 21 and the millimeter-wave radar 22.

In the case where the opposed lane edges are detected, the steering control is performed such that the vehicle 1 is steered to travel along approximately the middle of the lane, and the speed control is performed such that the vehicle 1 maintains a setup vehicle speed (constant speed) preliminarily set by the driver through the use of the setting vehicle speed input part 37 or by the system 100 based on given processing. Here, when the setup vehicle speed is greater than a speed limit (which is determined according to a speed sign or the curvature of a curve), priority is given to the speed limit, so that the vehicle speed of the vehicle 1 is limited to the speed limit. When the speed limit is determined according to the curvature of a curve, it is calculated by a given calculation formula, wherein it is set to a lower value as the curvature of the curve becomes larger (a curvature radius of the curve becomes smaller).

Further, when the setup vehicle speed of the vehicle 1 is greater than the vehicle speed of a preceding vehicle, the speed control is performed such that the vehicle 1 follows the preceding vehicle while maintaining an inter-vehicle distance appropriate to a follow-up vehicle speed. Then, when the preceding vehicle being followed by the vehicle 1 disappears from ahead of the vehicle 1 due to lane change or the like, the speed control is performed such that the vehicle 1 maintains the setup vehicle speed, again.

On the other hand, in a case where the opposed lane edges are not detected, and there is a preceding vehicle, the steering control is performed such that the vehicle 1 follows a traveling trajectory of the preceding vehicle, and the speed control is performed such that the vehicle 1 follows the speed on the traveling trajectory of the preceding vehicle.

Further, in a case where the opposed lane edges are not detected, and there is not any preceding vehicle (it is unable to detect any demarcation line and follow any preceding vehicle), it is unable to determine a traveling position on a traveling road. In this case, the driver manually controls vehicle steering and vehicle speed by manipulating the steering wheel, and the accelerator pedal and/or brake pedal so as to maintain or change a current traveling behavior (steering angle, yaw rate, vehicle speed, acceleration/deceleration, or the like) according to the will of the driver.

Secondly, the automatic speed control mode is a mode in which the speed control is performed such that the vehicle 1 maintains a given setup vehicle speed (constant speed) preliminarily set by the driver or the system 100, and involves the automatic speed control (the engine control and/or the brake control) to be executed by the driving support control system 100, wherein, basically, the automatic steering control is not performed. However, in a situation where the vehicle 1 deviates from a traveling road (lane) or is likely to collide with an obstacle (neighboring vehicle or structural object), deceleration control appropriate to a distance with the obstacle and the automatic steering control are executed by the driving support control system 100.

In this automatic speed control mode, although the vehicle 1 is controlled to travel to maintain the setup vehicle speed, the driver can increase the vehicle speed beyond the setup speed by depressing the accelerator pedal (accelerator override control). Further, when the driver performs brake manipulation, the highest priority is given to the will of the driver, and therefore the vehicle 1 is decelerated from the setup vehicle speed. In the automatic speed control mode, when the vehicle 1 catches up to a preceding vehicle, the speed control is performed such that the vehicle 1 follows the preceding vehicle while maintaining an inter-vehicle distance appropriate to a follow-up vehicle speed, and then when the preceding vehicle disappears, the speed control is performed such that the follow-up vehicle speed is returned to the setup vehicle speed.

Thirdly, the speed limiting mode is a mode in which the speed control is performed to prevent the vehicle speed of the vehicle 1 from exceeding a speed limit (legal speed limit) designated by a speed sign, and involves the automatic speed control (engine control) to be executed by the driving support control system 100. With respect to the legal speed limit, the ECU 10 may be configured to subject image data about an image of a speed sign or a speed marking on a road surface taken by the vehicle-mounted camera 21, to image recognition processing, to identify the legal speed limit, or may be configured to receive information regarding the legal speed limit from outside via a wireless communication. This legal speed limit is input from the ECU 10 into the driver manipulation unit 35, and displayed on the legal speed limit display of the approval input part 38. In the speed limiting mode, even when the driver depresses the accelerator pedal so as to increase the vehicle speed beyond the limiting speed, the vehicle speed of the vehicle 1 is increased only up to the limiting speed.

Fourthly, the basic control mode is a mode (off mode) in which none of the driving support modes is selected through the driver manipulation unit 35, and the automatic steering control and speed control are not executed by the driving support control system 100. However, the basic control mode is configured to execute an automatic anti-collision control. In this anti-collision control, when the vehicle 1 encounters a situation where it is likely to collide with a preceding vehicle or the like, the brake control is automatically executed to avoid the collision. It should be noted that the anti-collision control is also executed in the preceding vehicle following mode, the automatic speed control mode, and the speed limiting mode.

Further, the obstacle avoidance control (only the speed control, or the speed control and the steering control) is also executed in the automatic speed control mode, the speed limiting mode and the basic control mode.

Figure 2:
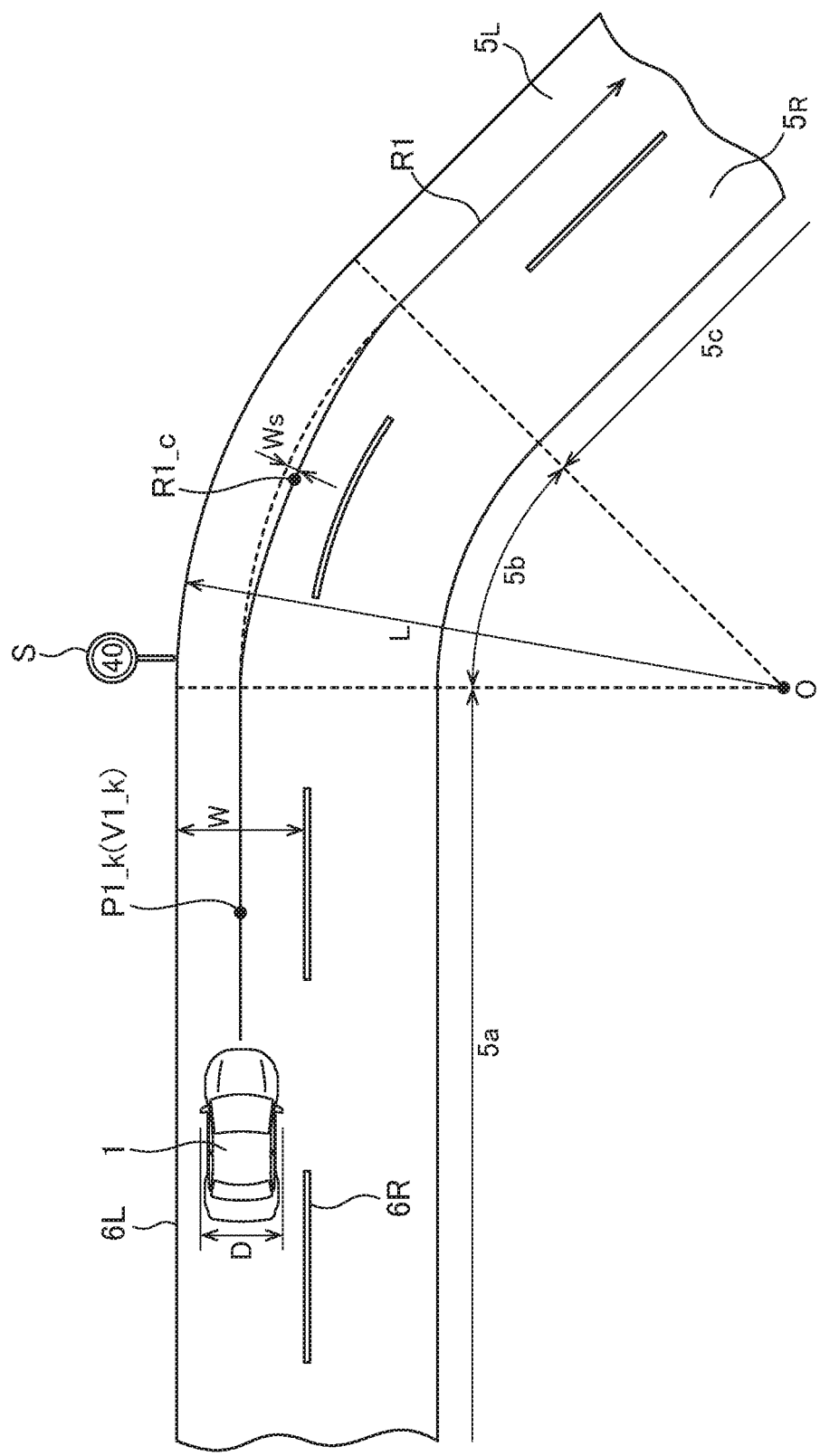
FIG. 2 is an explanatory diagram of a first traveling course in this embodiment.
Figure 3:
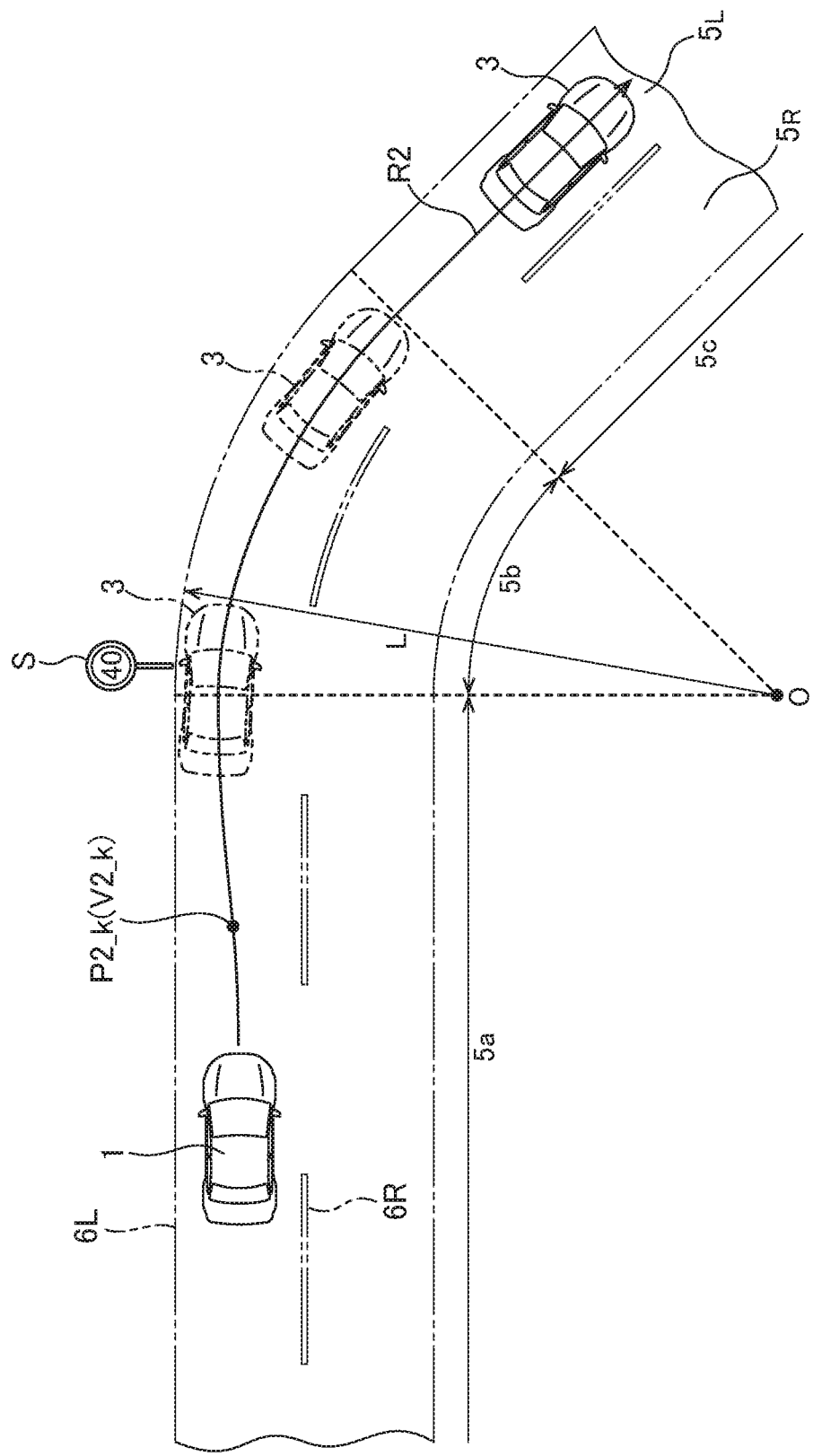
FIG. 3 is an explanatory diagram of a second traveling course in this embodiment.

Next, with reference to FIGS. 2 to 4, plural traveling courses to be calculated in the driving support control system 100 according to this embodiment will be described. FIGS. 2 to 4 are explanatory diagrams of first to third traveling courses, respectively. In this embodiment, the ECU 10 is configured to calculate the first to third traveling courses R1 to R3 temporally repeatedly (e.g., at intervals of 0.1 sec). In this embodiment, the ECU 10 is operable, based on information from the sensors and others, to calculate a traveling course in a period from a present time through until a given time period (e.g., 2 to 4 sec) elapses. The traveling course Rx (where x=1, 2, 3) is defined by a target position (Px_k) and a target speed (Vx_k) (where k=0, 1, 2, . . . , n) of the vehicle 1 on the traveling course.

Each of the traveling courses (first to third traveling courses) in FIGS. 2 to 4 is calculated based on the shape of a traveling road on which the vehicle 1 is traveling, the traveling trajectory of a preceding vehicle, the traveling behavior of the vehicle 1, and the setup vehicle speed, without taking into account obstacle information regarding an obstacle (including a parked vehicle, a pedestrian and the like) on the traveling road or around the traveling road (i.e., information regarding an obstacle whose situation can vary temporally), and traveling situation change information regarding a change in traveling situation. The traveling situation change information may include traveling regulation information regarding traveling regulation according to traffic regulations (a traffic light, a traffic sign and the like) (i.e., information detectable on site during traveling, instead of the map information), and lane change request information according to the will of the driver (the will to change a course, such as manipulation of a winker (turning signal)). As above, in this embodiment, the traveling course is calculated without taking into account the obstacle information, the traveling regulation information and the like, so that it is possible to keep down the overall calculation load for calculating the plural traveling courses.

For the sake of facilitating understanding, the following description will be made based on an example where each of the traveling courses is calculated on the assumption that the vehicle 1 travels on a road 5 consisting of a straight section 5a, a curve section 5b, a straight section 5c. The road 5 comprises left and right lanes 5L, 5R. Assume that, at a present time, the vehicle 1 travels on the lane 5L in the straight section 5a.

As shown in FIG. 2, the first traveling course R1 is set, by a distance corresponding to a given time period, to enable the vehicle 1 to maintain traveling within the lane 5L serving as the traveling road, in conformity to the shape of the road 5. Specifically, the first traveling course R1 is set, in each of the straight sections 5a, 5c, to enable the vehicle 1 to maintain traveling along approximately the widthwise middle of the lane 5L, and set, in the curve section 5b, to enable the vehicle 1 to travel on an inner side or in-side (on the side of a center O of a curvature radius L of the curve section 5*b*) with respect to the widthwise middle of the lane 5.

The ECU 10 is operable to execute the image recognition processing for image data about images around the vehicle 1 taken by the vehicle-mounted camera 21, to detect opposed lane edges 6L, 6R. The opposed lane edges are a demarcation line (white road line or the like), and a road shoulder or the like, as mentioned above. Further, the ECU 10 is operable, based on the detected opposed lane edges 6L, 6R, to calculate a lane width W of the lane 5L and the curvature radius L in the curve section 5*b*. Alternatively, the ECU 10 may be configured to acquire the lane width W and the curvature radius L from the map information of the navigation system 30. Further, the ECU 10 is operable to read, from the image data, a speed limit indicated by a speed sign S or on the road surface. Alternatively, the ECU 10 may be configured to acquire the speed limit from outside via a wireless communication, as mentioned above.

With regard to the straight sections 5*a*, 5*c*, the ECU 10 is operable to set a plurality of target positions P1_$k$ of the first traveling course R1 to enable a widthwise middle (e.g., the position of the center of gravity) of the vehicle 1 to pass through the widthwise middle between the opposed lane edges 6L, 6R. In this embodiment, the ECU 10 is operable to set the first traveling course R1 to enable the vehicle 1 to travel along the middle of the lane in each of the straight sections, as mentioned above. Alternatively, the ECU 10 may be configured to set the first traveling course R1 while reflecting a driving characteristic (preference or the like) of the driver, for example, such that the first traveling course R1 extends along a line adjacent to the middle of the lane and offset in the width direction by a given shift amount (given distance) with respect to the middle of the lane.

On the other hand, with respect to the curve interval 5*b*, the ECU 10 is operable to maximally set a displacement amount Ws toward the in-side from the widthwise middle position of lane 5L at a longitudinal middle position P1_$c$ of the curve interval 5*b*. This displacement amount Ws is calculated based on the curvature radius L, the lane width W, and a width dimension D of the vehicle 1 (prescribed value stored in the memory of the ECU 10). Then, the ECU 10 is operable to set a plurality of target positions P1_$k$ of the first traveling course R1 in such a manner as to smoothly connect the longitudinal middle position P1_$c$ of the curve section 5*b* to the widthwise middle position of each of the straight sections 5*a*, 5*b*. Here, it should be understood that the first traveling course R1 may also be offset toward the in-side in the straight sections 5*a* 5*c* at positions just before entering the curve section 5*b* and just after exiting the curve section 5*b*.

Basically, a target speed V1_$k$ at the target position P1_$k$ of the first traveling course R1 is set to a given setup vehicle speed (constant speed) preliminarily set by the driver through the use of the setting vehicle speed input part 37 of the driver manipulation unit 35 or by the system 100. However, when this setup vehicle speed exceeds the speed limit acquired from a speed sign or the like, or the speed limit determined according to the curvature radius L of the curve section 5*b*, the target speed V1_$k$ at the target position P1_$k$ on the traveling course is limited to a lower one of the two speed limits. Further, the ECU 10 is operable to correct the target position P1_$k$ and the target speed V1_$k$, according to a current behavior state (i.e., vehicle speed, acceleration/deceleration, yaw rate, steering angle, lateral acceleration, etc.) of the vehicle 1. For example, when a current value of the vehicle speed is largely different from the setup vehicle speed, the target speed is corrected so as to enable the vehicle speed to come close to the setup vehicle speed.

Basically, the first traveling course R1 is used in the situation where the opposed lane edges are detected. Thus, in a situation where the opposed lane edges are not detected, the first traveling course R1 needs not be calculated. However, in preparation for a situation where the first traveling course R1 is erroneously selected even though the opposed lane edges are not detected, the first traveling course R1 may be calculated in the following alternative manner.

In such a situation, the ECU 10 is operable, assuming that the vehicle 1 travels along the middle of the lane 5L, set virtual opposed lane edges, using the steering angle or yaw rate according to the vehicle speed of the vehicle 1. Then, the ECU 10 is operable, based on the virtually-set opposed lane edges, to calculate the first traveling course to enable the vehicle 1 to travel along the middle of the lane, in each of the straight sections and travel on the in-side of the lane, in the curve section.

As shown in FIG. 3, the second traveling course R2 is set, by a distance corresponding to a given time period, to enable the vehicle 1 to follow a traveling trajectory of a preceding vehicle 3. The ECU 10 is operable to continuously calculate the position and speed of the preceding vehicle 3 on the lane 5L on which the vehicle 1 is traveling, based on the image data from the vehicle-mounted camera 21, the measuring data from the millimeter-wave radar 22, and the vehicle speed of the vehicle 1 from the vehicle speed sensor 23, and store the calculated position and speed as preceding vehicle trajectory information, and, based on the preceding vehicle trajectory information, to set the traveling trajectory of the preceding vehicle 3 as the second traveling course R2 (a target position P2_$k$ and a target speed V2_$k$). The second traveling course R2 is basically selected in the situation where the opposed lane edges are not detected (therefore, in FIG. 3, load lines are indicated by the two-dot chain lines for the sake of facilitating understanding).

In this embodiment, the second traveling course R2 is basically calculated in the situation where a preceding vehicle is detected. Thus, in a situation where no preceding vehicle is detected, the second traveling course R2 needs not be calculated. However, in preparation for a situation where the second traveling course R2 is erroneously selected even though no preceding vehicle is detected, the second traveling course R2 may be calculated in the following alternative manner.

In such a situation, the ECU 10 is operable, assuming that a preceding vehicle is traveling at a position ahead of the vehicle 1 by a given distance according to the vehicle speed of the vehicle 1. Further, assume that this virtual preceding vehicle has the same traveling behavior (vehicle speed, steering angle, yaw rate, etc.) as that of the vehicle 1. Then, the ECU 10 is operable to calculate the second traveling course R2 to follow the virtual preceding vehicle.

As shown in FIG. 4, the third traveling course R3 is set, by a distance corresponding to a given time period, based on a current driving state of the vehicle 1 by the driver. Specifically, the third traveling course R3 is set based on a position and a speed estimated from a current traveling behavior of the vehicle 1.

The ECU 10 is operable, based on the steering angle, the yaw rate and the lateral acceleration of the vehicle 1, to calculate a target position P3_$k$ of the third traveling course R3 having the distance corresponding to the given time period. However, in the situation where the opposed lane edges are detected, the ECU 10 is operable to correct the target position P3_$k$ so as to prevent the calculated third traveling course R3 from coming close to or intersecting with any of the lane edges.

Further, the ECU 10 is operable, based on current values of the vehicle speed and the acceleration/deceleration of the vehicle 1, to calculate a target speed V3_$k$ of the third traveling course R3 having the distance corresponding to the given time period. Here, when the target speed V3_$k$ exceeds the speed limit acquired from the speed sign S or the like, the target speed V3_$k$ may be corrected so as not to exceed the speed limit.

Next, with reference to FIG. 5, a relationship between the driving support mode and the target traveling course in the driving support control system 100 will be described. FIG. 5 is an explanatory diagram showing the relationship between the driving support mode and the target traveling course. In this embodiment, the driving support control system 100 is configured such that, when the driver manipulates the mode selection switch 36 to select one of the driving support modes, the ECU 10 operates to select one of the first to third traveling courses R1 to R3 according to the measurement data from sensors and others. That is, in this embodiment, even when the driver selects a certain one of the driving support modes, the same traveling course is not always applied, but one of the traveling courses appropriate to a current traveling state is applied.

When the opposed lane edges are detected in a situation where the preceding vehicle following mode is selected, the first traveling course is applied, irrespective of the presence or absence of a preceding vehicle. In this case, the setup vehicle speed set through the use of the setting vehicle speed input part 37 is used as the target speed.

On the other hand, when the opposed lane edges are not detected but a preceding vehicle is detected in the situation where the preceding vehicle following mode is selected, the second traveling course is applied. In this case, the target speed is set according to the vehicle speed of the preceding vehicle. Further, when neither the opposed lane edges nor a preceding vehicle is detected in the situation where the preceding vehicle following mode is selected, the third traveling course is applied.

In the automatic speed control mode which is a mode in which the speed control is automatically executed, as mentioned above, the setup speed set through the use of the setting vehicle speed input part 37 is used as the target speed. Further, the driver manually controls vehicle steering by manipulating the steering wheel. Thus, although the third traveling course is applied, the vehicle 1 is likely not to travel along the third traveling course, depending on the driver's manipulation (of the steering wheel and/or the brake pedal).

Further, in a situation where the speed limiting mode is selected, the third traveling course is applied. In the speed limiting mode which is a mode in which the speed control is automatically executed, as mentioned above, the target speed is set according to the depression amount of the accelerator pedal by the driver, within the speed limit (maximum speed). Further, the driver manually controls vehicle steering by manipulating the steering wheel. Thus, although the third traveling course is applied, the vehicle 1 is likely not to travel along the third traveling course, depending on the driver's manipulation (of the steering wheel the brake pedal, and/or the accelerator pedal), as with the automatic speed control mode.

Further, in a situation where the basic control mode (off mode) is selected, the third traveling course is applied. The basic control mode is basically the same as the speed limiting mode in a state in which no speed limit is set.

Figure 6:
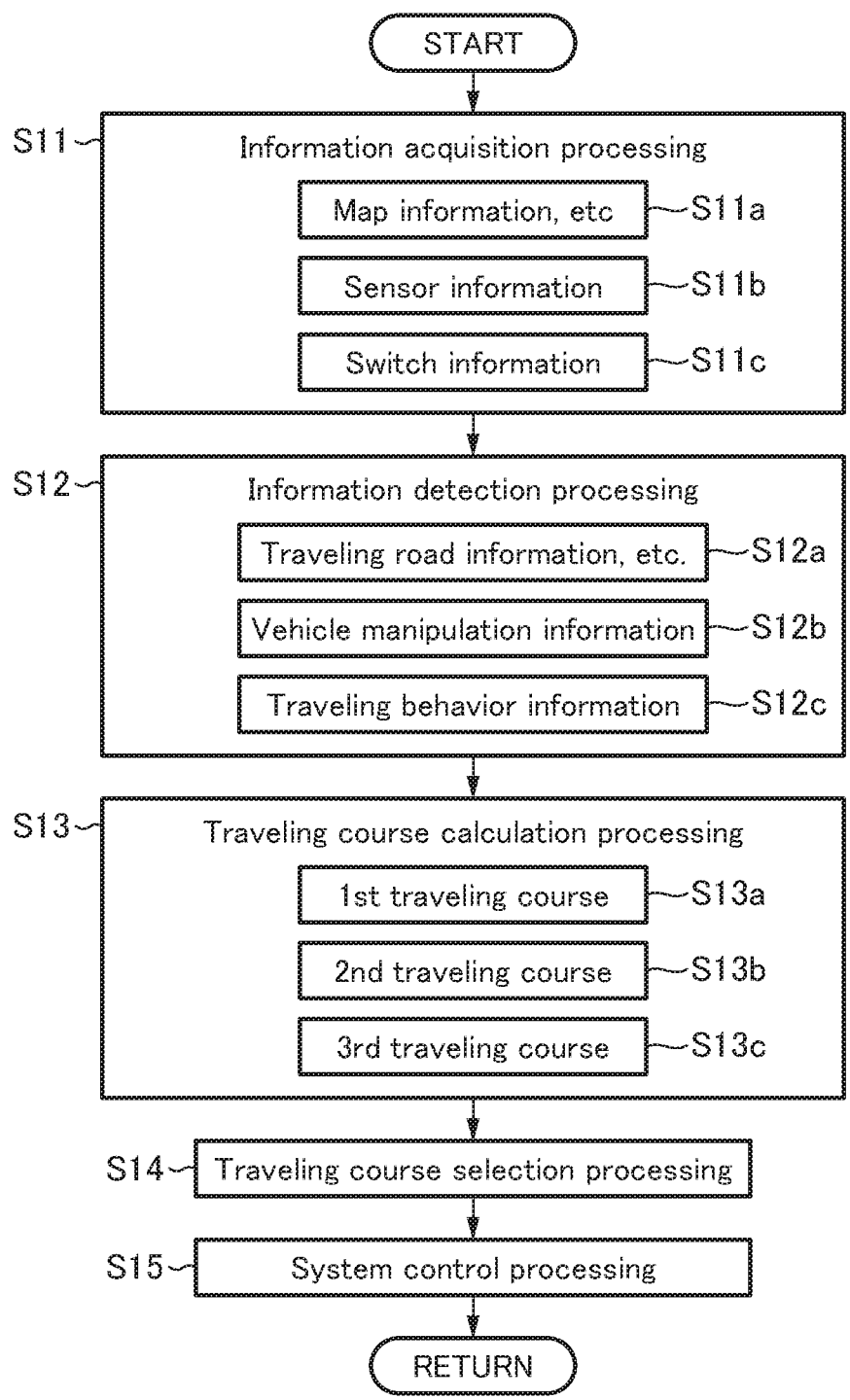
FIG. 6 is a processing flow of driving support control in this embodiment.

Next, with respect to FIG. 6, a processing flow of driving support control in the driving support control system 100 according to this embodiment will be described. FIG. 6 is the processing flow of the driving support control.

The ECU 10 operates to repeatedly execute the processing flow in FIG. 6 at intervals of a given time period (e.g., 0.1 seconds). First of all, the ECU 10 operates to execute information acquisition processing (S11). In the information acquisition processing, the ECU 10 operates to: acquire the current vehicle position information and the map information, from the position measurement system 29 and the navigation system 30 (S11$a$); acquire sensor information from the vehicle-mounted camera 21, the millimeter-wave radar 22, the vehicle speed sensor 23, the acceleration sensor 24, the yaw rate sensor 25, the driver manipulation unit 35 and others (S11$b$); and acquire switch information from the steering angle sensor 26, the accelerator sensor 27, the brake sensor 28, the turning signal sensor and others (S11$c$).

Subsequently, the ECU 10 operates to execute given information detection processing (S12), using a variety of information acquired in the information acquisition processing (S11). In the information detection processing, the ECU 10 operates to detect, from the current vehicle position information, the map information and the sensor information, the traveling road information regarding a shape of a traveling road around and ahead of the vehicle 1 (the presence or absence of a straight section and a curve section, the length of each of the sections, the curvature radius of the curve section, a lane width, the positions of opposed lane edges, the number of lanes, the presence or absence of an intersection, a speed limit determined by the curvature of a curve, etc.), the traveling regulation information (legal speed limit, red light, etc.), the obstacle information (the presence or absence, the position, the speed, etc., of a preceding vehicle or an obstacle), the preceding vehicle trajectory information (the position and the vehicle speed of a preceding vehicle) (S12$a$).

Further, the ECU 10 operates to: detect, from the switch information, vehicle manipulation information (the steering angle, the accelerator depression amount, the brake pedal depression amount, etc.) (S12$b$); and detect, from the switch information and the sensor information, traveling behavior information regarding the behavior of the vehicle 1 (the vehicle speed, the acceleration/deceleration, the lateral acceleration, the yaw rate, etc.) (S12$c$).

Subsequently, the ECU 10 operates to execute traveling course calculation processing, based on information obtained by calculation (S13). In the traveling course calculation processing, a first traveling course calculation processing (S13$a$), a second traveling course calculation processing (S13$b$) and a third traveling course calculation processing (S13$c$) are executed in the aforementioned manner.

Specifically, in the first traveling course calculation processing, the ECU 10 operates to calculate, based on the setup vehicle speed, the opposed lane edges, the lane width, the speed limit, the (actual) vehicle speed, the acceleration/deceleration, the yaw rate, the steering angle, the lateral acceleration, etc., the traveling course R1 (target position P1_$k$ and target speed V1_$k$) by a distance corresponding to a given time period (e.g., 2 to 4 sec), so as to enable the vehicle 1 to travel along approximately the middle of a lane in a straight section, and travel on the in-side of a curve in a curve section to have a larger turning radius, wherein a lowest one of the setup vehicle speed, a speed limit designated by a traffic sign, and a speed limit determined by the curvature of the curve is set as the maximum speed.

In the second traveling course calculation processing, the ECU 10 operates to calculate, based on the preceding vehicle trajectory information (position and speed) of the preceding vehicle acquired from the sensor information, etc., the traveling course R2 by a distance corresponding to a given time period, so as to enable to the vehicle 1 to follow the behavior (position and speed) of the preceding vehicle, while maintaining a given inter-vehicle distance between the preceding vehicle and the vehicle 1, i.e., behind the preceding vehicle by a time necessary to travel over the inter-vehicle distance.

In the third traveling course calculation processing, the ECU 10 operates to calculate the traveling course R3 estimated from a current behavior of the vehicle 1 based on the vehicle manipulation information, the traveling behavior information, etc., by a distance corresponding to a given time period.

Subsequently, the ECU 10 operates to execute the traveling course selection processing for selecting one target traveling course from the calculated three traveling courses (S14). In this processing, the ECU 10 operates to select the one target traveling course, based on the driving support mode selected by the driver through the use of the mode selection switch 36, detachability of the opposed lane edges, and the presence or absence of a preceding vehicle (see FIG. 5), as described above.

Subsequently, the ECU 10 operates to output, according to the selected driving support mode, a request signal to a concerned control sub-system (the engine control system 31, the brake control system 32 and/or the steering control system 33) so as to enable the vehicle 1 to travel on the finally calculated traveling course (S15).

Figure 7:
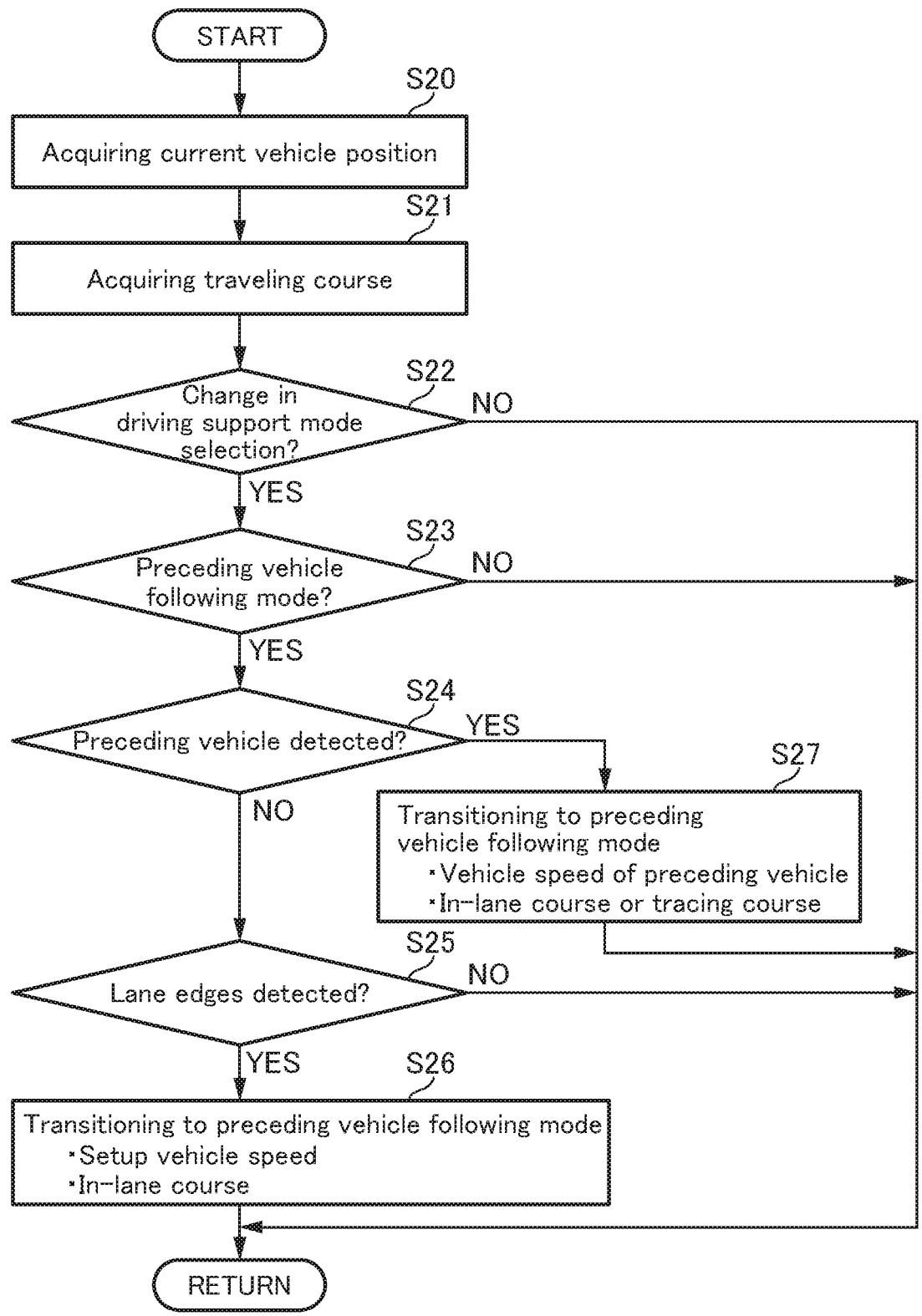
FIG. 7 is a processing flow during switching to a preceding vehicle following mode, in this embodiment.

Next, with reference to FIG. 7, mode switching processing for switching to the preceding vehicle following mode in the driving support control system 100 according to this embodiment will be described. FIG. 7 is a processing flow during switching to the preceding vehicle following mode. The ECU 10 operates to execute the processing routine in FIG. 7 temporally repeatedly. Here, the processing routine in FIG. 7 may be composed of a part of the traveling course selection processing (S14).

As mentioned above, in this embodiment, when the driver manipulates the mode selection switch 36 to select the preceding vehicle following mode, the transition to the preceding vehicle following mode is permitted. In this case, however, depending on detectability of opposed lane edges and the presence or absence of a preceding vehicle, a different target traveling course is selected. Thus, in this embodiment, in response to the manipulation for selecting the preceding vehicle following mode, the mode switching is performed by reflecting the driving intention of the driver.

First of all, upon start of the processing routine, the ECU 10 operates to acquire a current position of the vehicle 1 in the same manner as that in the step S11 of FIG. 6 (S20), and further acquire the traveling courses calculated in the step S13 of FIG. 6 (S21).

Subsequently, the ECU 10 operates to determine whether or not there is a change in the driving support mode selection signal received from the mode selection switch 36 (S22). When there is no change in the previously-received driving support mode selection signal (S22: NO), i.e., the same driving support mode is continuously selected, the ECU 10 operates to terminate one processing cycle.

On the other hand, when there is a change in the driving support mode selection signal (S22: YES), the ECU 10 operates to determine, based on the changed driving support mode selection signal, whether or not the driver intends to switch the current driving support mode to the preceding vehicle following mode (S23). When the intended switching destination is not the preceding vehicle following mode (S23: NO), the ECU 10 operates to terminate one processing cycle.

On the other hand, the intended switching destination is the preceding vehicle following mode (S23: YES), the ECU 10 operates to determine, based on the obstacle information, whether or not a preceding vehicle is detected (S24).

When no preceding vehicle is detected (S24: NO), the ECU 10 operates to determine, based on the traveling road information detected in the step S12 of FIG. 6, whether or not the positions of the opposed lane edges are detected (S25). When the positions of the opposed lane edges are detected (S25: YES), the ECU 10 operates to transition the driving support mode to the preceding vehicle following mode (S26), and then terminate one processing cycle. In this case, the first traveling course is selected as the target traveling course. Thus, the target speed is set to a given setup speed, and the target position is set such that the vehicle 1 travels at an appropriate position between the opposed lane edges.

On the other hand, when none of the positions of the opposed lane edges is detected (S25: NO), the ECU 10 operates to transition the driving support mode to the preceding vehicle following mode, and then terminate one processing cycle. In this case, the third traveling course is selected as the target traveling course.

On the other hand, when a preceding vehicle is detected (S24: YES), the ECU 10 operates to transition the driving support mode to the preceding vehicle following mode (S27), and then terminate one processing cycle. In this case, the first traveling course or the second traveling course is selected as the target traveling course, depending on detectability of the opposed lane edges. Specifically, when the opposed lane edges are detected, the target speed is set to the vehicle speed of the preceding vehicle, and the target position is set such that the vehicle 1 travels at an appropriate position between the opposed lane edges. On the other hand, when no opposed lane edges are detected, the target speed and the target position are set based on the preceding vehicle trajectory information.

Next, the functions of the driving support control system according to above embodiment will be described.

The driving support control device (ECU) 10 is capable of controlling a vehicle 1 in accordance with any one selected from plural driving support modes by a driver. The plural driving support modes include a preceding vehicle following mode. The ECI 10 is configured to, when a preceding vehicle is detected, be permitted to cause a transition to the preceding vehicle following mode, in response to a manipulation made by the driver to select the preceding vehicle following mode, and then control the vehicle 1 to follow the preceding vehicle. Further, the ECU 10 is configured to, when edges of a traveling road are detected even though no preceding vehicle is detected, be permitted to cause the transition to the preceding vehicle following mode, in response to the manipulation made by the driver to select the preceding vehicle following mode, and then control the vehicle 1 to travel on and along a given target traveling course (second traveling course) set based on the edges of the traveling road.

In the ECU 10 according to the above embodiment, upon selection of the preceding vehicle following mode by the driver, the driving support mode is transitioned to the preceding vehicle following mode. In the situation where the driver performs the manipulation for selecting the preceding vehicle following mode, it is assumed that the driver visually recognizes a followable preceding vehicle. That is, the driver performs the manipulation with a view to following the visually recognized preceding vehicle.

However, if detection of a preceding vehicle by a vehicle sensor is an essential condition for the transition to the preceding vehicle following mode, this transition is not permitted when no preceding vehicle is detected due to a positional relationship between a vehicle and a preceding vehicle. In this case, no switching to the preceding vehicle following mode is performed although the driver visually recognizes a preceding vehicle, i.e., the driving intention of the driver is not sufficiently reflected on the mode switching.

Therefore, the ECU 10 according to the above embodiment is configured to, when a preceding vehicle is detected, be permitted to cause the transition to the preceding vehicle following mode, in response to the selection manipulation, and, and to, when the edges of the traveling road are detected even though no preceding vehicle is detected, be permitted to cause the transition to the preceding vehicle following mode, in response to the selection manipulation. In the latter case, however, the vehicle 1 is controlled to travel on and along a given target traveling course set based on the detected edges of the traveling road.

As above, in the above embodiment, even when no preceding vehicle is detected, a probability that the transition to the preceding vehicle following mode is permitted upon the manipulation by the driver to select the preceding vehicle following mode is increased. This makes it possible to more sufficiently reflect the driving intention of the driver during the mode switching to the preceding vehicle following mode.

In the above embodiment, the ECU 10 is operable, in the preceding vehicle following mode and when no edges of the traveling road are detected although a preceding vehicle is detected, select the second traveling course as the target traveling course. According to this feature, as long as a preceding vehicle is detected even though no edges of the traveling road are detected, it is possible to control the vehicle 1b to travel along the trajectory of the preceding vehicle.

LIST OF REFERENCE SIGNS

1: vehicle
10: driving support control device
35: driver manipulation unit
36: mode selection switch
37: setting vehicle speed input part
38: approval input part
100: driving support control system

The invention claimed is:

1. A driving support control device capable of controlling a vehicle in accordance with any one selected from plural driving support modes by a driver,
wherein the plural driving support modes include a preceding vehicle following mode in which the vehicle is controlled to travel following a preceding vehicle with a steering control and a speed control, an automatic speed control mode in which control of causing the vehicle to travel at a given setup vehicle speed is executed with the speed control, and a speed limiting mode in which a vehicle speed of the vehicle is restricted from exceeding a legal speed limit designated by a speed sign on a road with the speed control, and wherein the driving support control device comprises a switch operated by the driver for selecting a desired driving support mode from the preceding vehicle following mode, the automatic speed control mode and the speed limiting mode, and when the preceding vehicle following mode is selected with the switch, the driving support control device is
configured to, when a preceding vehicle is detected, be permitted to cause a transition to the preceding vehicle following mode, in response to a manipulation made by the driver to select the preceding vehicle following mode, and then control the vehicle to follow the preceding vehicle, and
configured to, when edges of a traveling road are detected even though no preceding vehicle is detected, be permitted to cause the transition to the preceding vehicle following mode, in response to the manipulation made by the driver to select the preceding vehicle following mode, and then control the vehicle to travel on and along a given target traveling course set based on the edges of the traveling road instead of controlling the vehicle to travel following a preceding vehicle.

2. The driving support control device as recited in claim 1, wherein the given target traveling course is a traveling course set to maintain traveling within the traveling road.

3. The driving support control device as recited in claim 2, wherein the driving support control device is operable to:
temporally repeatedly calculate
a first traveling course which is set to maintain traveling within the traveling road,
a second traveling course which is set to follow a trajectory of a preceding vehicle, and
a third traveling course which is set based on a current traveling behavior of the vehicle on the traveling road; and
select, as the target traveling course, one of the calculated traveling courses, based on the driving support mode selected by the driver.

4. The driving support control device as recited in claim 3, wherein the driving support control device is operable, in the preceding vehicle following mode and when no edges of the traveling road are detected although a preceding vehicle is detected, to select the second traveling course as the target traveling course.

5. The driving support control device as recited in claim 3, wherein, when the preceding vehicle following mode is selected with the switch, the driving support control device is configured to determine whether or not a preceding vehicle is detected, and then determine whether or not edges of the traveling road are detected when no preceding vehicle is detected, and the driving support control device is
configured to, when the edges of the traveling road are detected, be permitted to cause the transition to the preceding vehicle following mode, and then select the first traveling course as the target traveling course, and
configured to, when no edges of the traveling road are detected, be permitted to cause the transition to the preceding vehicle following mode, and then select the third traveling course as the target traveling course.

6. The driving support control device as recited in claim 5, wherein, when the preceding vehicle is detected, the driving support control device is configured to be permitted to cause the transition to the preceding vehicle following mode, and then the driving support control device is
configured to determine whether or not the edges of the traveling road are detected, configured to, when the edges of the traveling road are detected, set the vehicle speed of the preceding vehicle as a target speed of the vehicle, and configured to, when no edges of the traveling road are detected, select the second traveling course as the target traveling course.

7. The driving support control device as recited in claim 3, wherein the first traveling course is set such that the vehicle travels on the in-side of a curve in a curve section and the lowest one of the setup vehicle speed, the legal speed limit designated by the speed sign, and a speed limit determined by the curvature of the curve is set as the maximum speed, the second traveling course is set based on trajectory information including position and speed of the preceding vehicle such that the vehicle follows the behavior of the preceding vehicle while maintaining a given inter-vehicle distance between the preceding vehicle and the vehicle behind the preceding vehicle by a time necessary to travel over the inter-vehicle distance based on vehicle speed, and the third traveling course is set based on the current traveling behavior of the vehicle to the extent that the vehicle does not intersect with the edges of the traveling road and the vehicle speed of the vehicle does not exceed the legal speed limit.

8. The driving support control device as recited in claim 1, wherein the driving support control device is operable to:
temporally repeatedly calculate
a first traveling course which is set to maintain traveling within the traveling road,
a second traveling course which is set to follow a trajectory of a preceding vehicle, and
a third traveling course which is set based on a current traveling behavior of the vehicle on the traveling road; and
select, as the target traveling course, one of the calculated traveling courses, based on the driving support mode selected by the driver.

9. The driving support control device as recited in claim 8, wherein the driving support control device is operable, in the preceding vehicle following mode and when no edges of the traveling road are detected although a preceding vehicle is detected, to select the second traveling course as the target traveling course.

10. The driving support control device as recited in claim 8, wherein the first traveling course is set such that the vehicle travels on the in-side of a curve in a curve section and the lowest one of the setup vehicle speed, the legal speed limit designated by the speed sign, and a speed limit determined by the curvature of the curve is set as the maximum speed, the second traveling course is set based on trajectory information including position and speed of the preceding vehicle such that the vehicle follows the behavior of the preceding vehicle while maintaining a given inter-vehicle distance between the preceding vehicle and the vehicle behind the preceding vehicle by a time necessary to travel over the inter-vehicle distance based on vehicle speed, and the third traveling course is set based on the current traveling behavior of the vehicle to the extent that the vehicle does not intersect with the edges of the traveling road and the vehicle speed of the vehicle does not exceed the legal speed limit.

11. The driving support control device as recited in claim 8, wherein, when the preceding vehicle following mode is selected with the switch, the driving support control device is configured to determine whether or not a preceding vehicle is detected, and then determine whether or not edges of the traveling road are detected when no preceding vehicle is detected, and the driving support control device is
configured to, when the edges of the traveling road are detected, be permitted to cause the transition to the preceding vehicle following mode, and then select the first traveling course as the target traveling course, and
configured to, when no edges of the traveling road are detected, be permitted to cause the transition to the preceding vehicle following mode, and then select the third traveling course as the target traveling course.

12. The driving support control device as recited in claim 11, wherein, when the preceding vehicle is detected, the driving support control device is configured to be permitted to cause the transition to the preceding vehicle following mode, and then the driving support control device is
configured to determine whether or not the edges of the traveling road are detected,
configured to, when the edges of the traveling road are detected, set the vehicle speed of the preceding vehicle as a target speed of the vehicle, and
configured to, when no edges of the traveling road are detected, select the second traveling course as the target traveling course.

* * * * *